(12) United States Patent
Joshi et al.

(10) Patent No.: US 11,032,294 B2
(45) Date of Patent: Jun. 8, 2021

(54) DYNAMIC DECRYPTION OF SUSPICIOUS NETWORK TRAFFIC BASED ON CERTIFICATE VALIDATION

(71) Applicant: Gigamon Inc., Santa Clara, CA (US)

(72) Inventors: Kishor Joshi, Milpitas, CA (US);
Manish Pathak, San Jose, CA (US);
Sandeep Dahiya, San Jose, CA (US)

(73) Assignee: Gigamon Inc., Santa Clara, CA (US)

( * ) Notice: Subject to any disclaimer, the term of this patent is extended or adjusted under 35 U.S.C. 154(b) by 243 days.

(21) Appl. No.: 15/845,635

(22) Filed: Dec. 18, 2017

(65) Prior Publication Data

US 2019/0058714 A1 Feb. 21, 2019

Related U.S. Application Data

(60) Provisional application No. 62/545,911, filed on Aug. 15, 2017.

(51) Int. Cl.
| | | |
|---|---|---|
| *G06F 21/00* | (2013.01) | |
| *H04L 29/06* | (2006.01) | |
| *H04L 9/32* | (2006.01) | |

(52) U.S. Cl.
CPC ........ *H04L 63/1408* (2013.01); *H04L 9/3268* (2013.01); *H04L 63/02* (2013.01); *H04L 63/0428* (2013.01); *H04L 63/0485* (2013.01); *H04L 63/0823* (2013.01); *H04L 63/10* (2013.01); *H04L 63/101* (2013.01); *H04L 63/1416* (2013.01); *H04L 63/1425* (2013.01); *H04L 63/1441* (2013.01); *H04L 63/166* (2013.01)

(58) Field of Classification Search
CPC ... H04L 63/1408; H04L 9/3268; H04L 63/02; H04L 63/0428; H04L 63/0485; H04L 63/0823; H04L 63/101; H04L 63/1416; H04L 63/1425; H04L 63/1441; H04L 63/166
See application file for complete search history.

(56) References Cited

U.S. PATENT DOCUMENTS

| | | | | |
|---|---|---|---|---|
| 8,677,466 | B1 * | 3/2014 | Chuang ................... | H04L 9/321 726/9 |
| 2009/0228986 | A1 * | 9/2009 | Adler ...................... | G06F 21/10 726/26 |
| 2011/0314270 | A1 * | 12/2011 | Lifliand .................. | H04L 63/30 713/151 |
| 2013/0031356 | A1 * | 1/2013 | Prince ................. | H04L 63/0823 713/151 |
| 2015/0281386 | A1 * | 10/2015 | Angeles .............. | G06F 11/3414 705/30 |

(Continued)

*Primary Examiner* — Mohammad W Reza
*Assistant Examiner* — Michael M Lee
(74) *Attorney, Agent, or Firm* — Perkins Coie LLP

(57) ABSTRACT

A disclosed method performed by a network device can include intercepting cryptographic certificates of host servers received in response to requests for encrypted connections between host servers and user devices, and determining that each encrypted connection is a suspicious connection or a normal connection based on a certificate validation policy. The method can further include causing decryption or metadata analysis of any suspicious encrypted connection and bypassing decryption or metadata analysis of any normal encrypted connection.

25 Claims, 6 Drawing Sheets

(56) References Cited

U.S. PATENT DOCUMENTS

| | | | |
|---|---|---|---|
| 2016/0359807 A1* | 12/2016 | Buruganahalli | H04L 63/0227 |
| 2017/0317837 A1* | 11/2017 | Alrawais | H04L 9/3268 |
| 2018/0124085 A1* | 5/2018 | Frayman | H04B 10/1149 |
| 2018/0332078 A1* | 11/2018 | Kumar | H04L 63/168 |
| 2019/0014088 A1* | 1/2019 | Subramaniyan | H04L 63/0281 |

* cited by examiner

DYNAMIC DECRYPTION OF SUSPICIOUS NETWORK TRAFFIC BASED ON CERTIFICATE VALIDATION

This application claims to the benefit of U.S. Provisional Patent Application No. 62/545,911 titled "Method to Configure Dynamic Decryption Policies for Malicious Traffic" and filed on Aug. 15, 2017, which is incorporated by reference herein in its entirety.

FIELD OF THE INVENTION

The disclosed teachings generally relate to techniques for detecting suspicious network traffic, and more particularly relate to network devices with policies that enforce selective decryption and/or reporting of suspicious network traffic based on cryptographic certificate validation to identify and mitigate malicious activities.

BACKGROUND

Communications over computer networks are typically encrypted so that the information contained in those communications remains inaccessible by third-parties. In particular, cryptographic protocols provide end-to-end encryption to secure communications over computer networks. Examples of cryptographic protocols include transport layer security (TLS) and secure sockets layer (SSL) protocols (both commonly referred to as "SSL" protocols). These protocols find widespread use in applications such as web browsing, email, instant messaging, and voice-over-IP (VoIP). In fact, currently about 50 percent of network traffic is SSL traffic. A common example of SSL traffic includes secure communications between network portals (e.g., web browsers) of user devices and information resources (e.g., websites) of host devices.

The effectiveness of a cryptographic protocol depends on a trust model such as a public key infrastructure (PKI) that defines roles, policies, and procedures required to create, manage, store, and revoke cryptographic certificates and manage public-key encryption. For example, a trusted entity is registered with an authorizing agent that can grant a cryptographic certificate ("certificate") for that entity. A user device or software can include a trust store used to store certificates from trusted certificate authorities, which are used to verify certificates presented by a server when establishing a connection in a network session. If a user device includes the authorizing agent in its trust store, the user device will presume that an entity presenting a certificate signed by the authorizing agent is trustworthy. If the certificate satisfies other conditions in addition to being signed by a trustworthy agent, the certificate is deemed valid or trusted.

For example, a web browser ("browser") of a user device can use an SSL handshake to establish a connection meant to fetch information from a web server. The browser has a trust store with trusted certificates and/or authorizing agents that is used to determine whether an SSL certificate presented by the web server is valid. If the certificate is valid, the connection is automatically established to allow traffic to flow over the connection. If not, establishing the connection requires creating an exception that could allow malicious traffic to flow on that connection. Hence, the trust models of cryptographic protocols are vulnerable to being exploited for malicious purposes by presenting forged certificates, causing users to create exceptions for seemly harmless connections, etc.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1A:
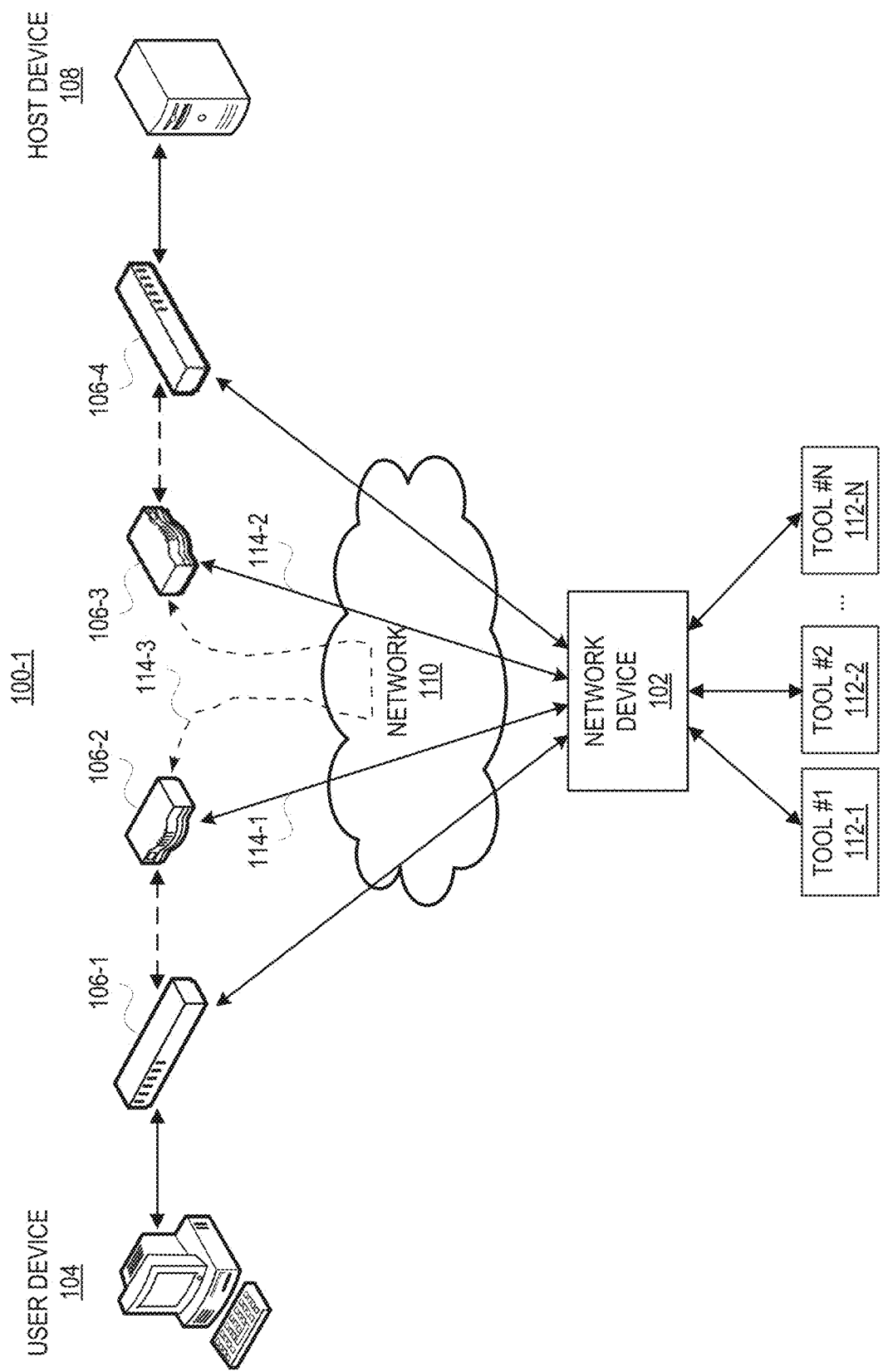
FIG. 1A depicts an example of a network arrangement in which a network device receives data packets from nodes in a computer network.

Reference to "one embodiment" or "an embodiment" means that a particular feature, structure, or characteristic described in connection with the embodiment is included in at least one embodiment of the disclosure. The appearances of the phrase "in one embodiment" in this disclosure are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for other embodiments.

As used herein, unless specifically stated otherwise, terms such as "processing," "computing," "calculating," "determining," "displaying," "generating," or the like, refer to actions or processes of an electronic device that manipulates and transforms data, represented as physical (electronic) quantities within the computer's memory or registers, into other data similarly represented as physical quantities within the device's memory, registers, or other such storage medium, transmission, or display devices.

When used in reference to a list of multiple items, the word "or" is intended to cover all of the following interpretations: any of the items in the list, all of the items in the list, and any combination of items in the list.

Unless the context clearly requires otherwise, throughout the description and the embodiments, the words "comprise," "comprising," and the like are to be construed in an inclusive sense, as opposed to an exclusive or exhaustive sense; that is to say, in the sense of "including, but not limited to."

As used herein, the terms "connected," "coupled," or any variant thereof, means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that information can be passed there-between, while not sharing any physical connection with one another.

The disclosed solution enables selective decryption and/or reporting of suspicious activity based on cryptographic certificate ("certificate") validation to detect malicious activity and take appropriate actions to mitigate that activity. The disclosed technology can override user-defined certificate exceptions, enforce certificate validation policies uniformly across a network, detect an anomaly without decrypting network traffic, cache blacklists of hosts and/or sessions with untrusted certificates, monitor cached sessions, generate certificate and session metadata, and decrypt and report selective suspicious traffic. This can operate in a transparent proxy mode without interfering with the experiences of users.

Some benefits of the disclosed solution include an easily deployable technology without performance degradation to existing networks. The disclosed technology increases security tool performance and throughput because only a subset of network traffic is decrypted to identify malicious traffic that can be stopped before reaching user devices. Moreover, the disclosed technology can more efficiently monitor suspicious activities compared to existing technologies, and enables forensics with metadata reports, all while securing communications from prying third-parties.

General System Overview

FIG. 1A depicts an example of a network arrangement 100-1 in which a network device 102 (e.g., network appliance) receives data packets from multiple devices and/or applications (collectively referred to as "nodes") in a computer network 110. The nodes (e.g., switches 106-1, 106-4 and routers 106-2, 106-3) couple a user device 104 to a host device 108 and allow data packets to be transmitted between the user device 104 and the host device 108. Examples of nodes include switches, routers, and network taps.

Each node represents an entry point into the computer network 110. The entry points, however, could be, and often are, from different points within the computer network 110. Generally, at least some of the nodes are operable to transmit data packets received as network traffic (or duplicate copies of the data packets) to a network device 102 for analysis. Thus, network traffic is directed to network device 102 by a node that provides an entry point into the computer network 110.

Whether a node transmits the original data packets or copies of the data packets to a device downstream of the node (e.g., the network device 102) depends on whether the downstream device is an inline device or an out-of-band device. As noted above, inline devices receive the original data packets, while out-of-band devices receive copies of original data packets. Generally, the network device 102 is deployed as an inline device and, thus, receives original data packets from whichever device is immediately upstream of the network device 102.

Here, for example, the network device 102 can receive original data packets from node 106-2 (e.g., via transmission path 114-1) and pass at least some of the original data packets to node 106-3 (e.g., via transmission path 114-2). Because node 106-2 is able to transmit network traffic downstream through the network device 102, node 106-2 need not be coupled directly to node 106-3 (i.e., transmission path 114-3 may not exist). Some or all of the nodes within the computer network can be configured in a similar fashion.

When the network device 102 is deployed as an inline device, data packets are received by the network device 102 at a (physical) network port of the network device. For example, data packets transmitted by node 106-2 via transmission path 114-1 are received by the network device 102 at a particular network port. The network device may include multiple network ports coupled to different nodes in the computer network 110. The network device 102 can be, for example, a monitoring platform that includes a chassis and interchangeable blades offering various functionalities, such as enhanced packet distribution and masking/filtering capabilities.

The network device 102 can also include multiple (physical) tool ports coupled to different network tools 112-1 through 112-$n$. As further described below, each network tool 112-1 through 112-$n$ can be deployed as an inline device or an out-of-band device at any given point in time. An administrator of the network device 102 may be able to switch the deployment mode of one or more of the network tools 112-1 through 112-$n$. That is, the administrator may be able to deploy an out-of-band network tool as an inline device and vice versa. When a network tool is deployed as an out-of-band device, the network device 102 creates a duplicate copy of at least some of the data packets received by the network device 102, and then passes the duplicate copies to a tool port for transmission downstream to the out-of-band network tool. When a network tool is deployed as an inline device, the network device passes at least some of the original data packets to a tool port for transmission downstream to the inline network tool, and those packets are then normally subsequently received back from the tool at a separate tool port of the network device, assuming the packets are not blocked by the tool.

Figure 1B:
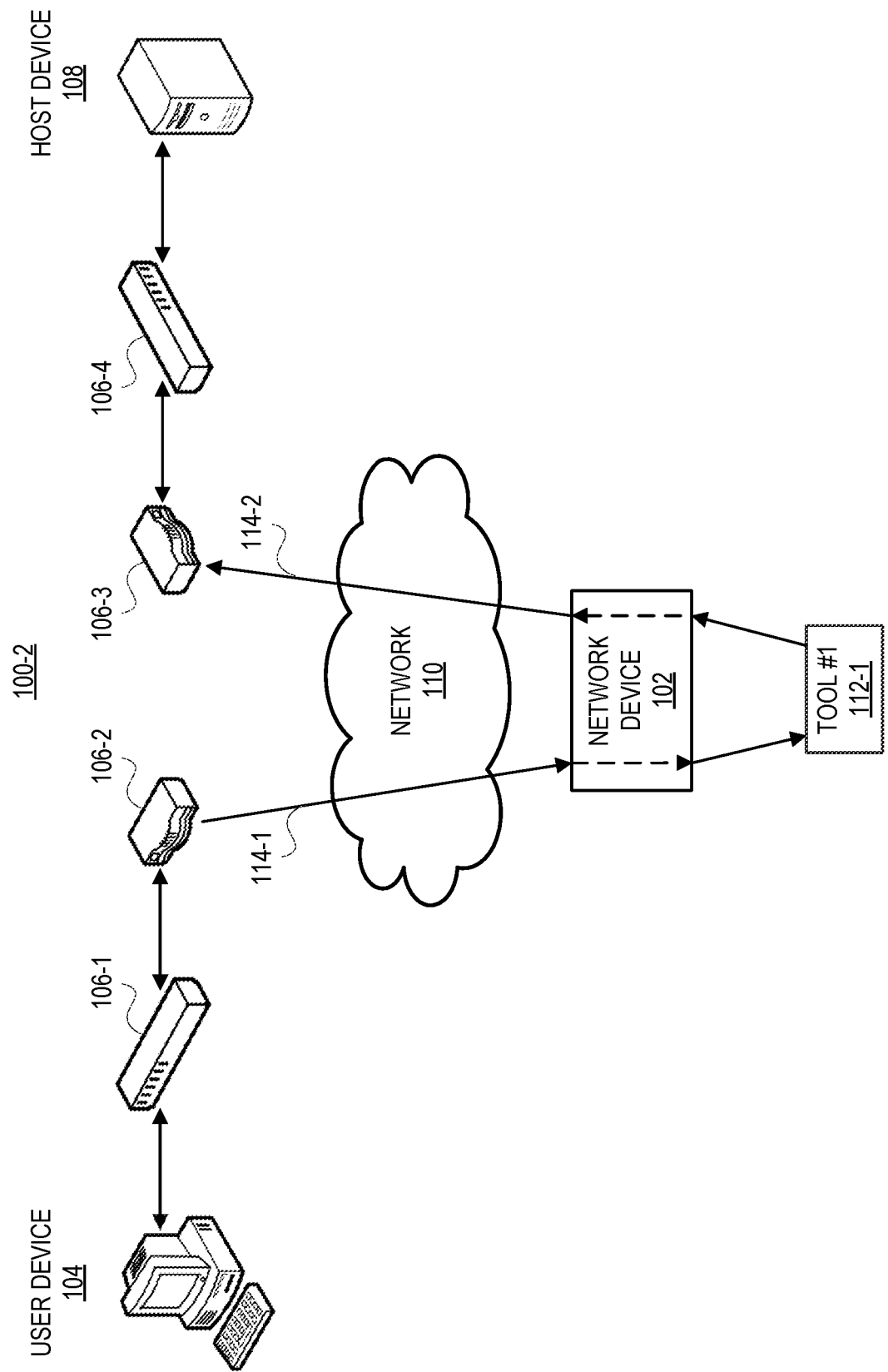
FIG. 1B depicts another example of a network arrangement in which a network device receives data packets from a node in a computer network.

FIG. 1B illustrates an example path of a data packet as the data packet travels from an user device 104 to a host device 108. More specifically, FIG. 1B depicts a network arrangement 100-1 in which the network device 102 and a network tool 112-1 are both deployed as inline devices (i.e., within the flow of network traffic). Although the transmission paths connecting the network device 102 and tool the 112-1 are half duplex wires (i.e., only transmit information in one direction), full duplex wires capable of transmitting information in both directions could also be used for some or all of the transmission paths between nodes of the computer network.

Upon receiving a data packet from node 106-2, the network device 102 identifies a flow map corresponding to the data packet based on one or more characteristics of the data packet. For example, the characteristic(s) could include the communication protocol of which the data packet is a part (e.g., HTTP, TCP, IP) or a session feature (e.g., a timestamp). Additionally or alternatively, the proper flow map could be identified based on the network port (of the network device) on which the data packet was received, or the source node from which the data packet was received.

The flow map represents a policy for how the data packet is to be handled by the network device 102. For example, the flow map could indicate that the data packet is to be aggregated with another data packet, filtered, modified (e.g., stripped of a header or payload), or forwarded to one or more tool ports. Moreover, the flow map could specify that the data packet is to be transmitted in a one-to-one configuration (i.e., from a network port of the network device 102 to a tool port of the network device 102) or one-to-many configuration (i.e., from a network port of the network device 102 to multiple tool ports of the network device 102). Similarly, a single tool port of the network device 102 could receive data packets from one or more network ports of the network device 102.

Often, the data packet is passed (e.g., by a processor of the network device 102) to a tool port for transmission downstream to a network tool (e.g., a monitoring and/or security-related tool). Here, for example, the flow map may specify that the data packet is to be passed by the network device 102 to a tool port for transmission downstream to tool 112-1. The network device may aggregate or modify the data packet in accordance with the policy specified by the flow map before passing the data packet to a tool port for transmission downstream to the network tool 112-1. In some embodiments, the network device 102 includes multiple tool ports, each of which is coupled to a different network tool.

After analyzing the data packet, the tool 112-1 normally transmits the data packet back to the network device 102 (i.e., assuming the tool 112-1 does not determine that the packet should be blocked), which passes the data packet to a network port for transmission downstream to another node (e.g., node 106-3). Because the data packet is transmitted from node 106-2 to node 106-3 through the network device 102 and tool 112-1, it is important to quickly and accurately identify potentially malicious data traffic before forwarding the traffic to downstream devices.

More broadly, a computing environment can include a network of computing systems including computing devices that communicate over networks with other computer systems. For example, a user device of a computer system can retrieve information over a network from a server computer of another computer system. The computer systems are vulnerable to being exposed to malicious activities. For example, information communicated over networks can be accessed by prying third-parties. To mitigate this risk, cryptographic protocols are implemented to secure sessions between endpoints of communication links.

A user device accessing encrypted information over a network from an untrusted information resource also risks being exposed to malicious information that can harm the network of computing devices including the client device. To mitigate this risk, a computer system may include a security tool (e.g., intrusion detection system (IDS), intrusion prevention system (IPS)) that must decrypt all incoming network traffic to detect suspicious traffic and take actions to mitigate any risks before a user device can receive the traffic. A computer system that includes a network of user devices could include respective network portals used to fetch information from untrusted resources. The security tool of the computer system would need to decrypt all incoming network traffic to mitigate the risk of harm on the computer system.

For example, a web browser ("browser") of a user device may seek to access a webpage over a network from a web server. A local area network (LAN) of a computer system including the user device may include a security tool (e.g., firewall) at the edge of the computer system to decrypt all network traffic before it reaches the requesting user device. As such, the firewall can perform an action on suspicious traffic (e.g., block the traffic) necessary to mitigate the risk of harm on the computer system including any number of computing devices. Hence, the security tool creates a bottleneck because numerous user devices, secured sessions, or flows would need to be decrypted to eliminate the risk of all malicious activities.

A cryptographic protocol that implements a trust model can eliminate the need for a security tool that must decrypt all network traffic to identify malicious traffic. For example, cryptographic protocols such as transport layer security/secure sockets layer ("TLS/SSL") incorporate a public key infrastructure (PKI) trust model to provide secure sessions and finds widespread use in applications such as searching the internet. A PKI can include roles, policies (e.g., including URL categories or TCP/IP 5-tuple based rules), and procedures required to create, manage, distribute, use, store, and revoke digital certificates and manage public-key encryption.

A trust model can help maintain the transfer of secure information over networks while assuring users that certified information resources are presumably trustworthy. The trust is achieved by binding public keys with respective resource entities. The binding is established by registering entities with an authorizing agent that grants certificates used as a proxy for trusting entities. For example, browsers can include a list of trusted authorities. When a browser is caused to access a website, the website provides its certificate to the browser. If the certificate is signed by a trusted authority of the browser's list, the browser will automatically render the website because it is presumed trustworthy. Thus, cryptographic protocols can keep underlying network traffic masked from prying third-parties while mitigating the risk of malicious traffic.

Unfortunately, bad actors are increasingly leveraging the trust model of cryptographic protocols to circumvent security tools. For example, certificates with forged signatures of trusted agents or expired certificates can be used by bad actors to harm a computer system with malicious information. As a result, information resources remain largely untrusted even when entities are supposedly trustworthy.

Reliable certificate validation is critical to TLS/SSL protocols because failure to perform proper validation can defeat the purpose of the protocols. Despite strong encryption and validation mechanisms, cryptographic protocols can be ineffective in certain situations. For example, browsers allow users to create exceptions to validation rules applied by the browsers. A browser may have exceptions for expired certificates, unknown authority agents, invalid hosts for an otherwise valid certificate, self-signed certificates, etc. As a result, browsers can inadvertently end-up with permanent exceptions of malicious destinations.

In another example, endpoint devices could have their trusted certificate stores compromised, which would make malicious certificates appear valid to a browser. In this case, even an otherwise alert user could be duped to visit malicious information sources and subject the user's network to security risks.

In another example, a bring-your-own-device (BYOD) environment has multiple vendors providing endpoint software and different trust stores. This can make it costlier to achieve a uniform certificate validation standard across the BYOD environment.

In yet another example, a revoked and potentially compromised certificate is used and the browser is unable to perform a revocation check either due to a check process being disabled or transient network failures. Thus, using security tools to analyze all network traffic creates an inefficient bottleneck and cryptographic protocols that implement trust models are unreliable.

Some solutions include security tools that use a list of trusted features as a proxy for the trustworthiness of network traffic. For example, a list of trusted URL categories can filter untrusted traffic, which can be forwarded the suspicious untrusted traffic to a security tool for additional analysis to identify malicious traffic. A list of TCP/IP 5-tuple based rules can filter untrusted traffic, which again can be forwarded the to a security tool for additional analysis to identify malicious traffic. Unfortunately, these solutions cannot adapt to highly dynamic security threats and, as a result, require decrypting and analyzing of all secured sessions to mitigate all risks. Therefore, the demands on network visibility are increasingly challenging as even more untrusted encrypted traffic needs to be decrypted by security tools.

Hence, network visibility is increasingly problematic as the volume of encrypted traffic increases. Combined with the variables described above including the fact that browsers can have lists with different trusted certificates, and end users can create different exceptions for untrusted certificates, computer systems are readily exposed to malware, viruses, and Trojans that use SSL traffic to infect networks and open backdoors for infecting networks.

Security Delivery Platform

The disclosed embodiments include a security delivery platform (SDP) that enables visibility into network activities and provides an optimal environment to transparently validate certificates. In some embodiments, the SDP is embodied as a network device and/or software that can provide options to configure one or more trust stores, certificate validation policies, tracking and reporting certificate validation errors (i.e., failed validations), and policies to decrypt traffic in case of certificate validation errors. Hence, the SDP can employ a trust model to improve the security and efficiency of communications between endpoint devices. For example, the SDP of a computer network system can apply certificate validation policies to incoming traffic, including a policy to offload suspicious traffic to a security tool. As such, the amount of traffic needing to be decrypted can be reduced substantially.

Figure 2:
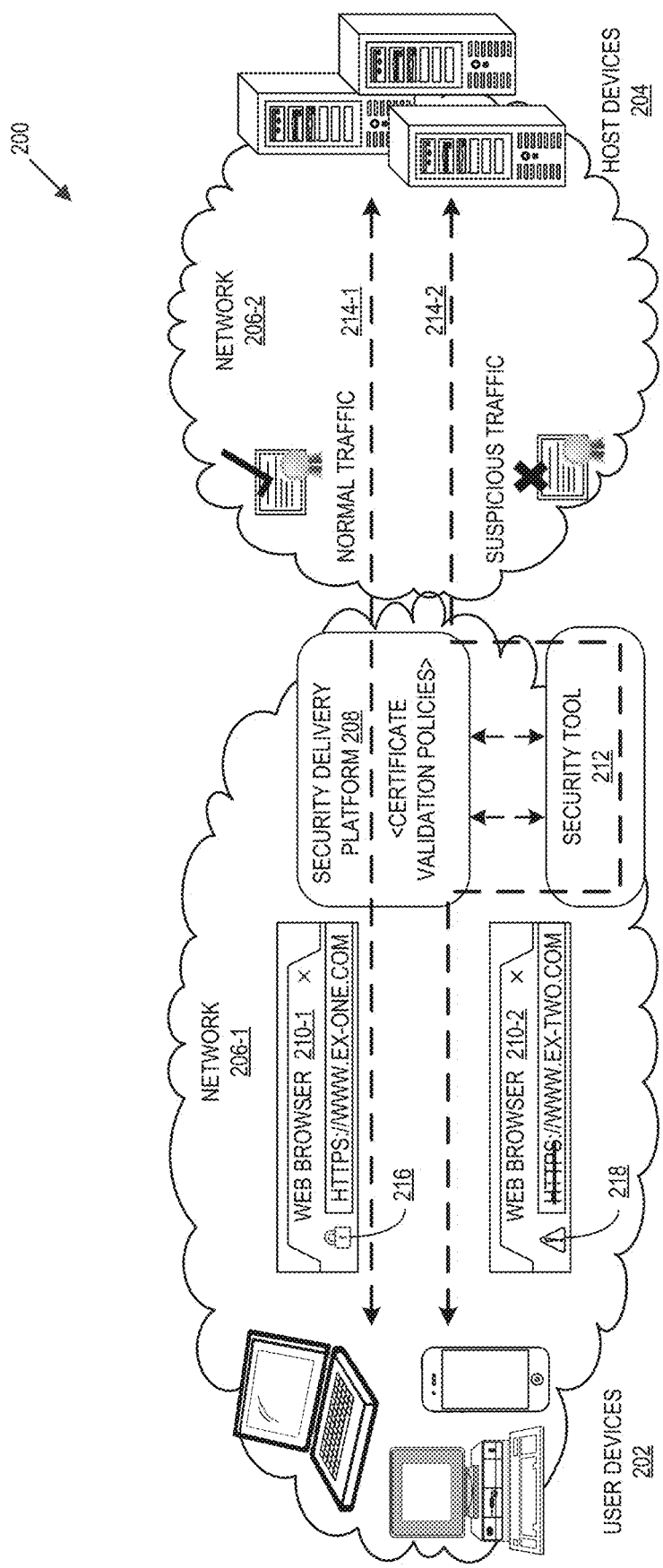
FIG. 2 is a block diagram illustrating a computing environment including a security delivery platform that enables selective decryption and/or reporting of suspicious activity based on cryptographic certificate validation to detect malicious activity and take appropriate actions to mitigate the malicious activity.

FIG. 2 is a block diagram illustrating a computing environment including an SDP that enables selective decryption and/or reporting of suspicious activity based on cryptographic certificate validation to detect malicious activity and take actions to mitigate the malicious activity. As shown, the computing environment 200 ("environment 200") has various components including user devices 202 (referred to individually as a user device 202) capable of communicatively coupling to host devices 204 (referred to individually as a host device 204) over one or more computer networks 206.

The environment 200 includes a SDP 208 that can apply certificate validation policies to certificates presented to browsers 210 of the user devices 202 by the host devices 204 during handshaking procedures. The environment 200 also includes a security tool 212 that can aid in detecting malicious activities and can perform actions to mitigate those activities. For example, the security tool 212 can decrypt suspicious SSL connections by using a trusted man-in-the-middle technique. The decrypted information can then be analyzed to determine whether traffic is malicious and the security tool 212 can block any malicious connections.

The connections 214-1 and 214-2 are examples of connections that can couple the browsers 210-1 and 210-2 of the user devices 202 and the host devices 204. The connection 214-1 carries normal traffic associated with a trusted certificate that was validated by the SDP 208. In contrast, the connection 214-2 carries suspicious traffic associated with an untrusted certificate that was not validated by the SDP 208. As such, the SDP 208 can reliably identify suspicious activity from the handshake procedure of a connection between endpoint devices. In contrast, prior techniques rely on URL categories, IP addresses, hostnames, or the like, which are unreliable because an attacker can easily change any of these features to bypass security rules.

One or more trust stores are used to store certificates from trusted authorities, which are used to verify certificates presented by a server in a cryptographic connection. In some embodiments, a trust store could include other attributes used as a proxy for determining whether a connection is normal or suspicious. In particular, a user device or browser can include a user trust store for certificate validation purposes. The user trust stores can be managed by users to, for example, create exceptions that allow connections with information resources that presented untrusted certificates.

The SDP 208 can have its own central trust store that is tightly controlled compared to the user trust stores. For example, users may not be authorized to change the central trust store (e.g., create an exception). Instead, the central trust store is managed by a central authority (e.g., network administrator). Therefore, the environment 200 may include different user-end trust stores for the different user devices 202 or browsers 210 and a common central trust store at the SDP 208 for the devices of the network 206-1.

Each component of the environment 200 may include combinations of hardware and/or software to process information, perform functions, or communicate over the networks 206. For example, any component of the environment 200 may include a processor, memory or storage, a network transceiver, a display, operating system (OS) and application software (e.g., for providing a user interface), or the like. Other components, hardware, and/or software included in the environment 200 that are well known to persons skilled in the art are not shown or discussed herein for the sake of brevity.

The networks 206 may include any combination of private, public, wired, or wireless portions. For example, the SDP 208 is illustrated at the ingress point of a private computer network 206-1 that interfaces with another computer network 206-2. The information communicated over the networks 206 may be encrypted or unencrypted at various locations or along different portions of the networks 206. For example, the SDP 208 may be located at the edge of a private network 206-1 including the user devices 202 and the security tool 212. As such, the SDP 208 belongs to a private computer network and interfaces to another network 206-2 such as a public network (e.g., internet) or another private network that includes the host devices 204. The certificate validation policies of the SDP 208 could be applied to incoming network traffic to identify suspicious traffic, which can be offloaded to the security tool 212 for further inspection to identify malicious traffic and take actions to mitigate the effects of the malicious traffic.

The user devices 202 can be used to interact with the environment 200. Examples of the user devices 202 include smartphones (e.g., APPLE IPHONE, SAMSUNG GALAXY, NOKIA LUMINA), tablet computers (e.g., APPLE IPAD, MICROSOFT SURFACE), computers (e.g., APPLE MACBOOK, LENOVO THINKPAD), and any other computing device that is capable of communicating over the networks 206.

The user devices 202 can each execute a browser (e.g., browser 210), which is a software application for retrieving, presenting, and traversing information resources on a network. An information resource is identified by a uniform resource identifier (URI/URL) that may be a webpage, image, video or other content. Hyperlinks present in retrieved information enable users to navigate the browsers to related information resources. Although browsers are primarily used for accessing the internet, they can be used to access information on servers in private networks. Examples of browsers include GOOGLE CHROME, MOZILLA FIREFOX, and INTERNET EXPLORER.

A browser can fetch information from resources for the user devices 202, allowing them to render the information and then navigate to other resources. This process begins when a browser receives a URL input by a user. For example, the browser 210-1 includes the URL "https://www.ex-one.com/" in the browser 210-1's URL field. The prefix of the URL, the uniform resource identifier (URI), determines how the URL will be interpreted. The most commonly used kind of URI starts with "http:" and identifies a resource to be retrieved over the hypertext transfer protocol (HTTP). Once the resource has been retrieved, the browser 210 renders the HTML and associated content, and causes a user device 202 to display it.

The host devices 204 are information resources, which may execute on any number of server computers or any other computing devices that operate to serve the information to the browsers 210 of the user devices 202 over the networks 206. An example of a host device is a web server that hosts a website.

The SDP 208 can apply certificate validation policies to identify suspicious connections for the browsers 210 requesting content from the host devices 204. The security tool 212 can decrypt the suspicious connections to identify malicious connections. Hence, the certificate validation process of the SDP 208 enables a selective decryption of suspicious connections based on handshake procedures to reduce the number of flows offloaded to the security tool 212 for decryption. As such, the SDP 208 can enhance monitoring of the network 206-1 and improve the performance of the security tool 212 by reducing its load needing decryption.

For example, a user of a user device 202 enters a URL into browser 210-1, which is used to initiate a handshake procedure that fetches a certificate from a host device 204. The certificate is received by the SDP 208 and processed in accordance with configurable validation policies and the central trust store. The certificate is also received by the browser 210-1 and processed in accordance with validation policies and the user trust store. Once validated by the user device 202, the browser 210-1 can render the retrieved content. In some embodiments, the browser 210-1 can display an icon 216 (e.g., lock icon) indicating a trusted connection. Hence, normal traffic traverses the connection 214-1.

In another example, a user of another host device 204 enters a URL into browser 210-2, which is used to initiate a handshake procedure that fetches a certificate and content from another host device 204. The certificate is received by the SDP 208 and processed in accordance with the same configurable validation policies. In this instance, the certificate fails the configurable the validation policies of the SDP 208. As such, the associated connection is deemed untrusted and is offloaded to the security tool 212, which can decrypt the suspicious connection 214-2 to identify malicious activity. The certificate is also received by the browser 210-2 and processed in accordance with validation policies and the user trust store. If the certificate is not validated, the user could create an exception for the suspicious connection so that browser 210-2 can render the retrieved content. In some embodiments, the browser 210-2 can display an warning icon 218 and cross-out the "HTTPS" to indicate to the connection is untrusted. As such, suspicious traffic is traversing the connection 214-2.

In some embodiments, the processing of certificates by the SDP 208 is transparent to the user devices 202. In other words, the SDP 208 does not necessarily alter user experiences by performing validation processes at the SDP 208 in addition to the validation processes performed at the user devices 202. Instead, the SDP 208 creates an added layer of security that is tightly controlled to monitor and track secured connections between the user devices 202 and the host devices 204 to identify malicious connections and cause actions that uniformly mitigate malicious activity across the network 206-1.

The effectiveness of the SDP 208 is limited by its trust model. For example, a certificate that is signed by a trusted authority could have expired, the signature of a trusted authority could be forged, the issue date of the certificate could be faked. Moreover, a user could create an exception for an untrusted certificate that was not validated by the SDP 208. For example, the browser 210-2 can present a pop-up window, to prompt the user to create an exception for an untrusted certificate. The user can then click on a control of the pop-up window to create the exception allowing the user device that created the exception to access information on an suspicious connection while the exception remains enforced, which could be for a limited time or permanent. For example, the exception may remain enforced only for a browser used to create the exception and/or only for the session where the exception was created.

The SDP 208 improves on the certificate validation process by selectively passing suspicious connections to the security tool 214 for decryption and inspection to identify malicious connection. The SDP 208 can reduce the load on the security tool 212 by selectively allowing normal flows associated with trusted certificates to forego decryption by the security tool 212. A flow is "normal" when the secured connection of the flow is "trustworthy" because its certificate passed the validation processes of the SDP 208. For example, the certificate may be deemed "valid" if it has a valid issue date, expiration date (e.g., not yet expired), is signed by an trusted authority, etc.

However, decrypting all the offloaded SSL connections (e.g., sessions) remains resource intensive. Hence, it is desirable to further reduce the load on the security tool 212 by identifying a smaller subset of all flows for decryption. The disclosed embodiments overcome these drawbacks with configurable dynamic decryption policies for suspicious traffic based on SSL certificate validations by the SDP 208. For example, embodiments include a technique to transparently detect a rogue host device based on an SSL certificate validation by the SDP 208.

The SDP 208 can validate certificates transparently by providing options to configure a set of trusted certificates, certificate validation policies, tracking and reporting certificate validation errors, and policies to decrypt traffic in case of validation errors. The SDP 208 can transparently detect a violation of user created exception, and decrypt and forward related traffic to security tools for further analysis. In addition, any certificate or certificate authority that has been previously associated with a malicious connection can be tracked and subjected to decryption or reporting. Thus, the disclosed techniques can include selective decryption of SSL traffic, reporting detailed session metadata of suspicious connections in order to filter normal sessions and reduce the load on metadata collectors, and certificate blacklist APIs for security tools.

For example, the disclosed selective decryption of secured connections can be achieved with an inline network device (e.g., SDP 208) that includes a number of configurable policies. The polices could cause the network device to perform any of detecting suspicious connections, monitoring or tracking connections, selectively decrypting secured connections to identify malicious activities, log metadata of suspicious connections to identify malicious activities by performing forensics on the logged metadata, and perform actions on malicious activities to mitigate their effects.

A policy may include one or more rules or criteria configured to achieve a network objective. For example, a policy could include a rule to selectively decrypt network traffic associated with an expired certificate. The network traffic associated with the expired certificate is deemed suspicious and an action could be taken on the suspicious traffic. For example, a rule could forward copies of suspicious traffic to a security tool that decrypts the copies to determine whether the suspicious traffic is normal or malicious. Another rule can cause a network device to act upon decrypted information that is malicious. For example, the security tool can cause the monitoring device to block any malicious traffic. For example, the monitoring device can terminate any connections between client devices and a server associated with the expired certificate, and/or prevent any future connections to that server.

In some embodiments, a malicious connection can be identified without needing to decrypt a suspicious connection. Instead, information about a suspicious connection associated with an untrusted certificate (e.g., metadata) could be logged in a memory. The logged information can be monitored or tracked to identify malicious activity. Hence, instead of (or in addition to) selectively decrypting SSL connections, the SDP 208 can include policies to log metadata of suspicious connections associated with untrusted certificates and collect more information about the logged connections. As such, the SDP 208 can log the collected metadata and perform forensic analysis on the logged metadata to identify malicious activities without decrypting connections.

In some embodiments, the SDP 208 can use the status of a certificate as a filter for metadata reporting. For example, a metadata reporting technique can use a certificate validation status as a filter. In particular, a policy could cause the collection of additional information and reporting of that information connections associated with untrusted certificates. This technique is particularly useful where legal compliance forbids decrypting certain information such as health or financial information. Rather than allowing all such connections without performing any security check, the SDP 208 can include a policy to report metadata in lieu of decrypting those connections.

For example, the SDP 208 can log metadata of any exceptions that were defined by the user devices 202. The SDP 208 can monitor those exceptions, related end user devices, or related host devices to collect more information about their behavior. The detection of any anomalous activity can indicate that the exception is associated with malicious activity. For example, a user device creating numerous exceptions may indicate that the user device was infected with malicious software and all the exceptions for that user device could be flagged as being malicious, and terminated for that user device and any other user device of the same network.

As indicated above, an inline network device can monitor certificate chains that get communicated during SSL handshakes between endpoint devices. For example, the SDP 208 can be embodied as an inline monitoring device between the user devices 202 and the host devices 204 to monitor the connections 214. The SDP 208 can include one or more policies that are configured by an authorized user and executed to selectively decrypt SSL traffic.

For example, a certificate chain associated with the connection 214-2 fails to comply with one or more configurable validation policies. The SDP 208 can deem the network traffic of the connection 214-2 as suspicious, and offload the suspicious traffic to a security tool 212 for decryption. A rule of a policy could cause the SDP 208 to offload all future connections between the user devices 202 and the particular host device associated with the untrusted certificate to the security tool 212.

In some embodiments, the security tool 212 could forward the decrypted information to one or more other security tools that performs further analysis on the suspicious traffic. As such, a distributed security platform can make determinations such as, for example, whether to drop any connections that are deemed to be compromised or quarantine an endpoint associated with the failed validation. Additionally, a fingerprint of the untrusted certificate can be cached to avoid any other proxying connections.

In some embodiments, a single network device can perform the monitoring, selective decryption, metadata reporting, identification of malicious activity, and performing actions to mitigate the malicious activities. For example, the SDP 208 and security tool 212 can be embodied as a single network device that monitors certificates from the host devices 204. Rather than offload any suspicious traffic to another network device, the SDP 208 can selectively decrypt suspicious connections and could terminate malicious connections.

Figure 3:
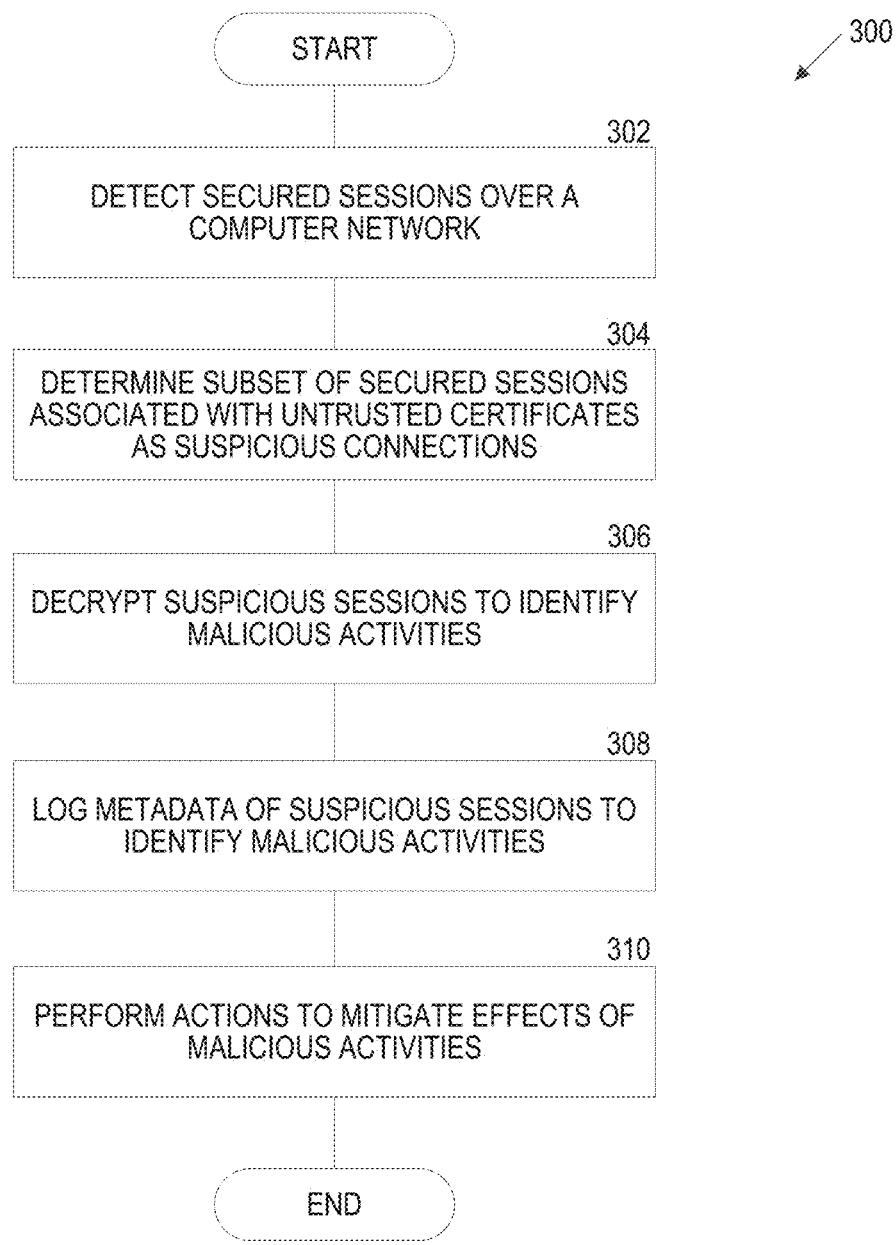
FIG. 3 is a flowchart illustrating a method performed by one or more network devices to detect a subset of suspicious connections based on cryptographic certificate validations to identify malicious activities and perform actions to mitigate the effects of the malicious activities.
Figure 4:
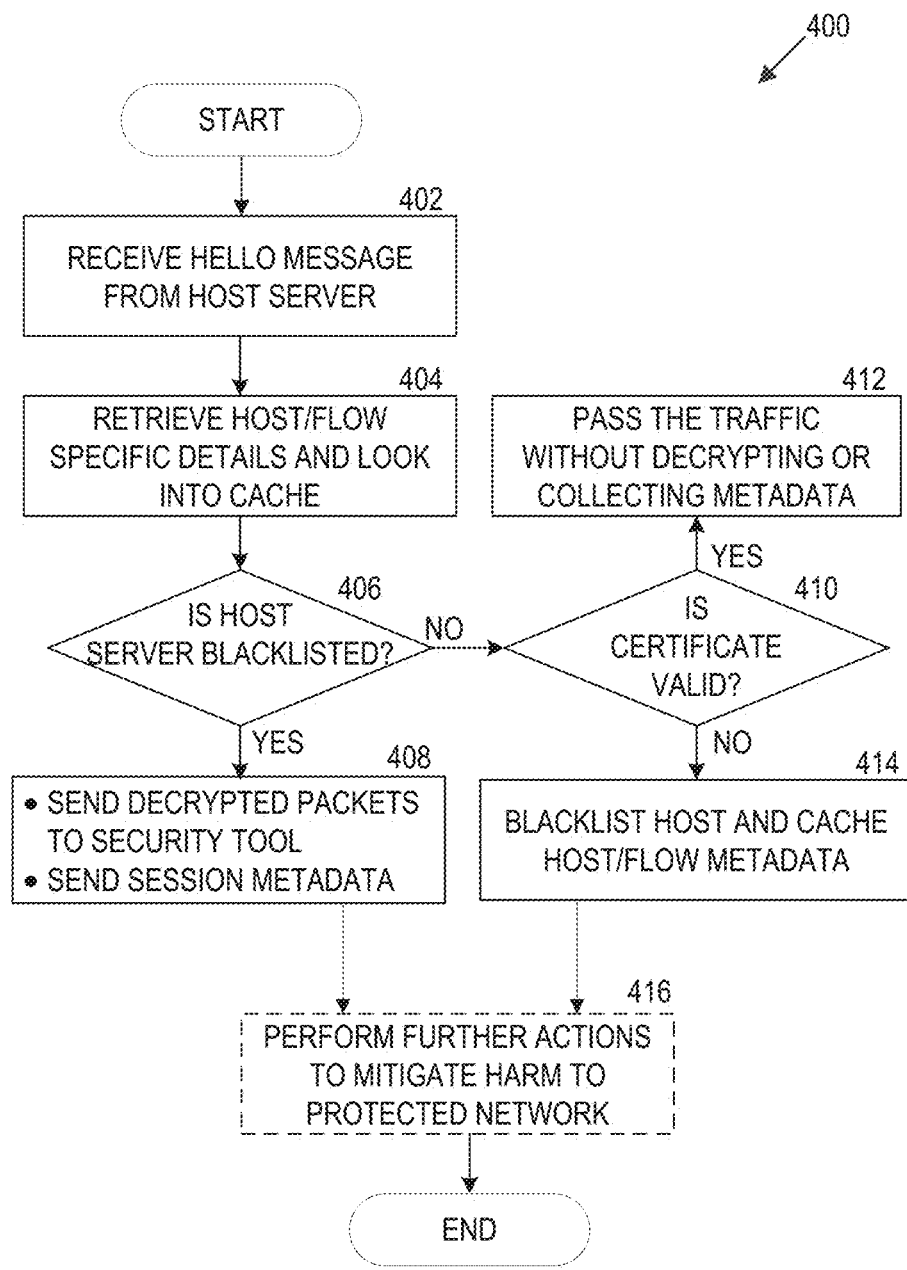
FIG. 4 is a flowchart illustrating a method of a particular configuration of policies enforced by a network device to filter suspicious network traffic from normal traffic based on a blacklist and a certificate validation process.

To aid in understanding the breadth of possibilities contemplated by this disclosure to achieve the described benefits, FIG. 3 illustrates a relatively broad application of the disclosed techniques and FIG. 4 illustrates a particular implementation of the disclosed techniques. The description of these figures demonstrates the scope of the disclosed embodiments including different combinations of the disclosed concepts to detect suspicious activity based on a certificate validation process, identify malicious activities, and perform actions to mitigate harmful effects.

FIG. 3 is a flowchart illustrating a method 300 performed by one or more network devices to detect a subset of suspicious connections based on certificate validations to identify malicious activities and perform actions to mitigate the effects of the malicious activities. In particular, the network devices include one or more policies that are applied to one or more secured connections or indications of one or more secured connections (collectively referred to as "sessions" in FIG. 3). For example, the network devices could apply the policies to requests (or existing) secured sessions. By applying the policies, a subset of the suspicious sessions are detected for decryption or monitoring/tracking rather than merely passing the secured traffic to user devices.

In step 302, the network devices detect indications of secured sessions between one or more user devices and one or more host devices over one or more networks. An indication may include a handshake, which is an automated process of negotiation that dynamically sets parameters of a communication established between two the user devices and host devices before normal communication over the channel begins. For example, a browser of a user device may seek to establish a connection with a webpage from a web server. The network devices can detect the secured session between the user device and the web server.

In step 304, the network device applies one or more policies to information indicative of secured sessions to identify a subset of suspicious secured sessions. For example, certificate validation policies can be applied to cryptographic certificates of the secured sessions in order to identify a subset of suspicious sessions having untrusted certificates. The suspicious sessions are potentially malicious sessions, and actions could be taken on any malicious sessions to mitigate their harmful effects.

In some embodiments, the network devices can include a number of policies arranged as a hierarchy of configurable policies including one or more rules or criteria applied to the secured sessions. A policy's objective can include identifying a suspicious session by comparing a certificate of each secured session to a list of trusted certificates in a centralized trust store of the network devices, in addition to the trust store of the user device. The received certificate is deemed "untrusted" if it is not in the centralized trust stores and its associated secured session is deemed suspicious of malicious activity. On the other hand, the secured session of a trusted certificate has traffic that can pass to the user device without further action.

A policy's objective can include identifying a suspicious session in accordance with a certificate validation process by examining attributes of each certificate of each secured session in order to determine whether the certificate is valid. For example, a policy could include rules or criteria to check whether a certificate has a valid issue date, has not expired, and is signed by a trusted authority from a list of trusted authorities. If so, the certificate is deemed valid or trusted. Otherwise, the certificate is deemed invalid or untrusted.

A policy's objective can include monitoring, tracking, and/or reporting information about an untrusted certificate or associated sessions which had certificate validation errors. For example, additional information of a certificate or associated session that failed a validation policy could be used to identify a suspicious session based alone on collected metadata without decrypting the suspicious session. In some embodiments, the collected information could be used to update existing policies or create new policies. In some embodiments, another policy could cause the secured session that has a failed validation to be decrypted, and the decrypted information can be analyzed to determine whether the secured session is malicious.

A policy's objective can include determining whether a secured session has violated a certificate validation exception. For example, the network devices could include a policy for handling exceptions including a rule that causes a secured session having an untrusted certificate to pass to client devices without performing any action to determine whether the secured session is suspicious.

In yet another example, a policy's objective can include determining whether a secured session, certificate, or certificate authority was previously associated with a malicious activity and was subsequently monitored/tracked, decrypted, or reported to a security tool.

These non-limiting examples of policies are illustrative of any number or type of policies that could be implemented for dynamic decryption and/or reporting of selected secured sessions. The subset of suspicious sessions can include a combination of secured sessions that have been identified as being suspicious based on any combination of policies. For example, the subset of suspicious sessions can include a secured session with a certificate identified in a blacklist of untrusted certificates, and another secured session could have an expired certificate that is not on the blacklist of certificates.

In step 306, the subset of suspicious sessions are decrypted to determine whether their decrypted information indicates that a session is malicious. For example, packets communicated in a suspicious session can be decrypted by a network device that detected the suspicious session or can be forwarded to another network device (e.g., a security tool) that performs the decryption. The decrypted information can then be analyzed to identify whether the suspicious session is malicious and could cause the network devices to perform an action to mitigate risks accordingly. As such, the decryption and any further process is selective. For example, the decryption may apply only to flows associated with a specific combination of a particular host address and a particular certificate, and some of those decrypted flows may be selected for forwarding to security tools for further analysis.

In step 308, the network device can log metadata of suspicious sessions and monitor/track the suspicious sessions or their untrusted certificates to collect more metadata of the suspicious sessions or their untrusted certificates. A forensics analysis can be performed on the logged metadata to identify malicious activity. In some embodiments, logging metadata of suspicious sessions can be performed instead of decrypting suspicious sessions or in addition to decrypting suspicious sessions.

For example, the subset of suspicious sessions can include sessions that are selected for decryption to identify malicious activities, and other sessions can be selected for logging metadata instead of being decrypted. The latter could include sessions carrying information that legally cannot be decrypted without the authority of the information's owner. This includes, for example, private health or financial information carried on certain sessions. The network devices can monitor/track related exceptions, untrusted certificates, related user devices, or related host devices to collect more information about the suspicious sessions. The detection of any additional anomalous activity can indicate malicious activity. For example, a logged user device creating numerous exceptions may indicate that the user device has malicious software. In addition, the detailed session metadata could be reported and used for filtering normal sessions in order to reduce the load on metadata collectors.

In step 310, the network devices can perform an action to mitigate the risk of any malicious session. For example, a network device could be caused to forbid establishing the secured session, terminate an established secured session, and/or block any future sessions related to untrusted certificates, related user devices, or related host devices. For example, the untrusted certificate or host device that presented the untrusted certificate could be added to a blacklist applied against certificates of any future secured sessions. In some embodiments, the blacklisting is a time-based blacklisting that enforces blacklisting untrusted certificate, related user devices, or related host devices for only a limited period of time (e.g., 24 hours).

In some embodiments, an application programming interface (API) for certificate blacklisting can be deployed to quickly identify and/or act upon malicious sessions. The API can be executed by a network device (e.g., security tool). When a blacklisted certificate is detected during a communication handshake between endpoint devices of a network, the session of the blacklisted certificate can be dropped (e.g., terminated). This will help block malicious traffic in an early phase when establishing a session without requiring a deeper application layer analysis.

FIG. 4 is a flowchart illustrating a particular example method 400 of a particular configuration of policies enforced by an inline network device to filter suspicious network traffic from normal traffic based on a blacklist and a certificate validation process. In particular, the network device performs dynamic classification of suspicious traffic based on a blacklist and certificate validation.

In step 402, the network device receives a hello message from a host server in response to a request from a user device seeking a connection with the host server. For example, a browser of a user device can receive a URL causing it to seek a connection with a web server hosting a website associated with the URL. The web server sends a hello message for the browser, and the network device intercepts the hello message, which also traverses the network device to the browser.

In step 404, the network device receives information about the host server and/or associated traffic flow of the host server. Hence, the network device can intercept diverse information used to establish a connection between endpoint devices. For example, the information intercepted by the network device can be part of a ServerCertificate TLS handshake message, include attributes of the host server and other information indicating a source, destination, protocol, type of device, etc. The received information can be stored and/or compared to information stored in a cache to make determinations about the flow and/or host server.

The network device includes one or more policies to identify suspicious or malicious traffic, and can take specified actions on that traffic accordingly. For example, information identifying the host server can be compared against a list of blacklisted host servers in step 406. That is, a policy can be applied to the received information related to the flow or host server to determine whether the host server is on a blacklist of suspicious or malicious host devices. The blacklist may include untrusted certificates or other attributes of flows of host devices that have been deemed suspicious or malicious.

In step 408, the network device decrypts the flow of the blacklisted host device, and sends decrypted packets to a port of a security tool for analysis. In addition, or alternatively, metadata of the flow can be stored in a memory for monitoring or tracking purposes to subsequently perform a forensics analysis in order to identify a malicious activity without decrypting the flow. The stored metadata can be used to filter additional metadata of other flows. For example, for sessions with certificate chains that are not in compliance with a configuration, more details of similar flows can be reported and/or collected for forensics analysis.

In step 410, if the host server is not blacklisted, a policy is applied to the certificate presented by the host server. For example, the inline network device has a centralized trust store separate and distinct from the trust store of user devices or their browsers. The centralized trust store has a compilation of trusted certificates that cannot be changed by unauthorized users. The centralized trust store is used to determine whether network traffic is normal or suspicious. In particular, the network device includes one or more certificate validation policies applied to a certificate chain to identify suspicious traffic associated with untrusted certificates. For example, the policies can validate the certificate if it satisfies rules that require the certificate to not exceed its expiration date, have an issue date within a specified range, and be signed by a trusted authority.

In step 412, if the certificate is deemed valid, the associated flow is deemed normal and passes to the user device without being decrypted and/or without collecting metadata used to identify suspicious traffic. As such, for example, a browser can receive the encrypted flow and decrypt it locally to improve the efficiency of the network device, which is enabled to selectively decrypt only some of numerous flows that it processes.

In step 414, if the certificate is deemed invalid, information identifying the host server can be stored in a blacklist and/or other information associated with the suspicious flow memory, for application to other flows. For example, information indicative of the host server can be stored in the blacklist to prevent any user device from accessing the host server for a limited or indefinite period of time. In some embodiments, information related to the suspicious flow is stored in a blacklist that can be applied to any future connection requests for the host server. In some embodiments, a stored certificate validation status can be used to filter metadata of flows. For example, for sessions with certificate chains that are not in compliance with a configuration, more details of associated flows can be reported and/or collected for forensics analysis.

The network device could act on any suspicious or malicious traffic in accordance with policies. For example, in step 416, the network device can optionally perform actions to mitigate harm to the protected network. For example, the network device can identify SSL flows and associated rogue hosts with a certificate validation process associated with a ServerCertificate TLS handshake message. Attributes of the host server such as an IP address, server address, and server certificate can be used to classify it as a "rogue," and a combination of these attributes can be stored in memory for application to SSL flows that can be similarly deemed as rogue hosts and blocked from accessing the network protected by the network device.

Computing System

Figure 5:
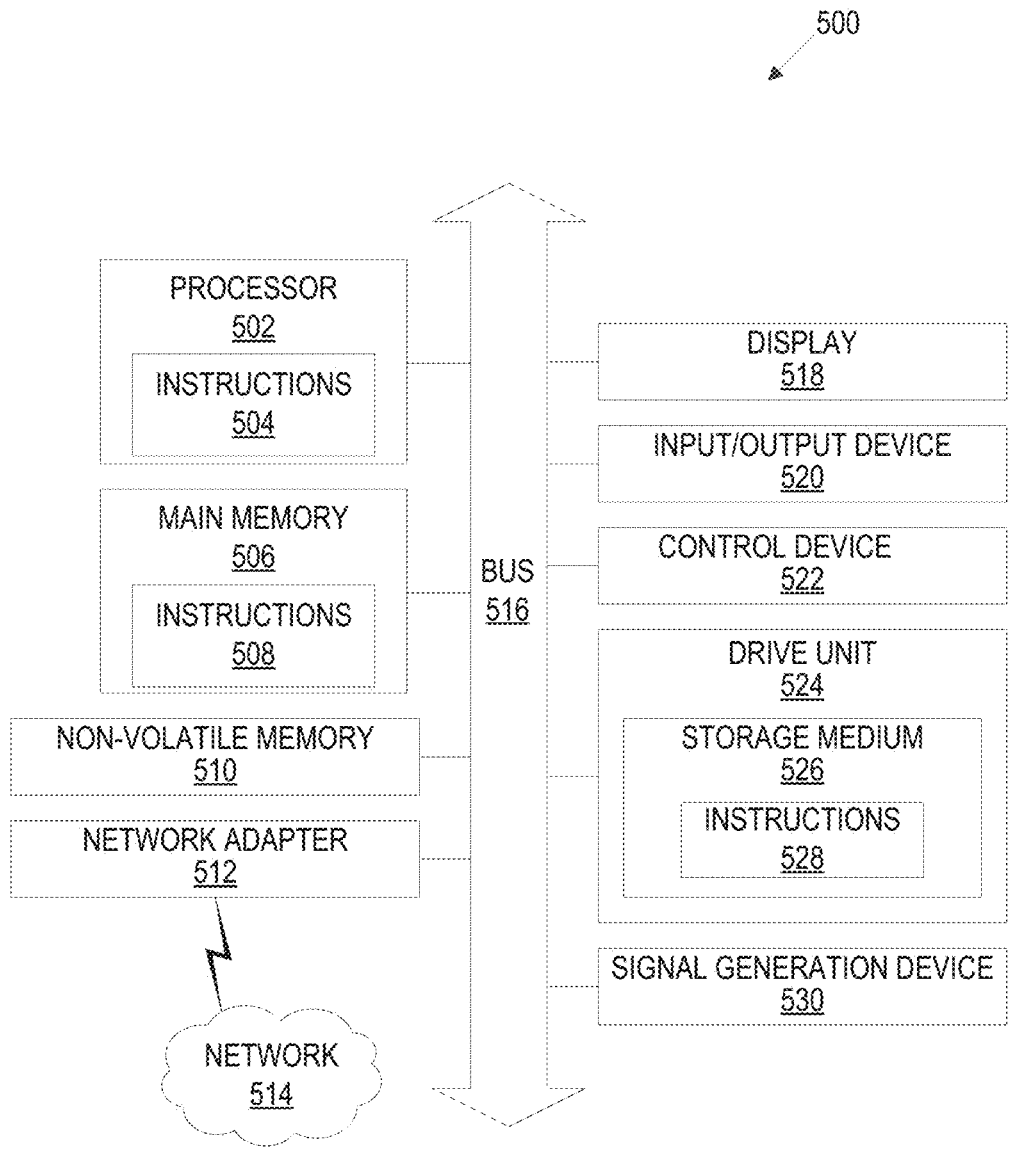
FIG. 5 is a high-level block diagram illustrating an example of a computing system in which at least some operations described herein can be implemented.

FIG. 5 is a block diagram illustrating an example of a computing system 500 (e.g., user device 202, host device 204, SDP 208, security tool 212) in which at least some operations described herein can be implemented. The computing system 500 may include one or more central processing units (e.g., processors 502), main memory 506, non-volatile memory devices 510, network adapter 512 (e.g., network interface), display 518, input/output devices 520, control device 522 (e.g., keyboard and pointing devices), drive unit 524 including a storage medium 526, and signal generation device 530 that are communicatively connected to a bus 516.

The bus 516 is illustrated as an abstraction that represents any one or more separate physical buses, point-to-point connections, or both connected by appropriate bridges, adapters, or controllers. The bus 516, therefore, can include, for example, a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 2394 bus, also called "Firewire." A bus may also be responsible for relaying data packets (e.g., via full or half duplex wires) between components of a network device, such as a switching engine, network port(s), tool port(s), etc.

In some embodiments, the computing system 500 operates as a standalone device, although the computing system 500 may be connected (e.g., wired or wirelessly) to other machines. For example, the computing system 500 may include a terminal that is coupled directly to a network device. As another example, the computing system 500 may be wirelessly coupled to the network device.

In various embodiments, the computing system 500 may be a server computer, a client computer, a personal computer (PC), a user device, a tablet PC, a laptop computer, a personal digital assistant (PDA), a cellular telephone, an IPHONE, an IPAD, a BLACKBERRY, a processor, a telephone, a web appliance, a network router, switch or bridge, a (handheld) console, a gaming device, a music player, any portable, mobile, hand-held device, or any machine capable of executing a set of instructions (sequential or otherwise) that specify actions to be taken by the computing system.

While the main memory 506, non-volatile memory device 510, and storage medium 526 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 528. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 504, 508, 528) set at various times in various memory and storage devices in a computer, and that, when read and executed by one or more processing units or processors 502, cause the computing system 500 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 510, floppy and other removable disks, hard disk drives, optical disks (e.g., compact disk read-only memory (CD-ROM), digital versatile disks (DVDs)), and transmission type media such as digital and analog communication links.

The network adapter 512 enables the computing system 500 to mediate data in a network 514 with an entity that is external to the computing system 500, such as a network device, through any known and/or convenient communications protocol supported by the computing system 500 and the external entity. The network adapter 512 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 512 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here can be implemented by, for example, programmable circuitry (e.g., one or more microprocessors), programmed with software and/or firmware, entirely in special-purpose hardwired (i.e., non-programmable) circuitry, or in a combination of such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended embodiments. Accordingly, the specification and drawings are to be regarded in an illustrative sense rather than a restrictive sense.

The invention claimed is:

1. A method comprising:
   intercepting, by a network device of a computer network, a plurality of cryptographic certificates of a plurality of host servers received in response to a plurality of requests for a plurality of encrypted connections between the plurality of host servers and a plurality of user devices;
   determining, by the network device, whether each encrypted connection is a suspicious connection or a normal connection based on an application of a certificate validation policy to each cryptographic certificate;
   responsive to determining that a first encrypted connection of the plurality of encrypted connections is a suspicious connection, causing decryption of the first encrypted connection or analysis of metadata associated with the first encrypted connection;
   responsive to determining that a second encrypted connection of the plurality of encrypted connections is a normal connection, causing bypass of decryption of the second encrypted connection or of analysis of metadata associated with the second encrypted connection;
   and overriding a certificate exception created by a user device of the plurality of user devices, in a transparent proxy mode without interfering with experiences of the plurality of user devices.

2. The method of claim 1 further comprising:
   identifying malicious activity by causing the decryption of the first encrypted connection and causing inspection of the decrypted connection.

3. The method of claim 2 further comprising:
offloading the decrypting of the first encrypted connection to another network device.

4. The method of claim 1 further comprising:
logging the metadata associated with the first encrypted connection in a memory;
collecting additional metadata associated with the first encrypted connection based on the logged metadata;
logging the additional metadata in the memory; and
identifying malicious activity associated with the first encrypted connection by analyzing the metadata and additional metadata logged in the memory.

5. The method of claim 4, wherein the metadata includes an indication of a host server of the plurality of host servers or a user device of the plurality of user devices associated with the first encrypted connection and the additional metadata includes communications of the host server or the user device, respectively.

6. The method of claim 1 further comprising:
identifying malicious activity by analyzing the metadata associated with the first encrypted connection without decrypting the first encrypted connection.

7. The method of claim 6 further comprising:
performing an action to mitigate harm of the identified malicious activity.

8. The method of claim 7, wherein the performing the action to mitigate harm by the malicious activity comprises:
blocking a connection between a host server of the plurality of host servers associated with the first encrypted connection and a user device of the plurality of user devices.

9. The method of claim 7, wherein performing the action to mitigate harm by the malicious activity comprises:
blacklisting a host server of the plurality of host servers associated with the first encrypted connection.

10. The method of claim 1, wherein the network device has a trust store including a trusted attribute, and the determining whether each encrypted connection is a suspicious connection or a normal connection comprises:
determining that an encrypted connection of the plurality of encrypted connections is a normal connection when its cryptographic certificate satisfies the trusted attribute; or
determining that the encrypted connection is a suspicious connection when its cryptographic certificate does not satisfy the trusted attribute.

11. The method of claim 10, wherein the trusted attribute is a trusted cryptographic certificate.

12. The method of claim 10, wherein the trusted attribute is a signature of a trusted authorizing agent that signs the cryptographic certificates.

13. The method of claim 1, wherein the network device has a trust store including a plurality of trusted cryptographic certificates, and the determining that the encrypted connection is a suspicious connection or a normal connection comprises:
determining that an encrypted connection of the plurality of encrypted connections is a suspicious connection when its cryptographic certificate does not match any of the plurality of trusted cryptographic certificates; or
determining that the encrypted connection is a normal connection when its cryptographic certificate matches any of the plurality of trusted cryptographic certificates.

14. The method of claim 1, wherein the network device is an edge device of a private computer network including the plurality of user devices, and the plurality of host servers are accessible over a public network.

15. The method of claim 1, wherein the network device and the plurality of user devices belong to a private computer network, and the plurality of host servers each belong to one or more private networks different from the private network of the network device.

16. The method of claim 1, wherein a request of the plurality of requests is for a webpage hosted by a host server and an encrypted connection is a secure sockets layer (SSL) connection.

17. The method of claim 1, wherein the network device and the plurality of user devices belong to a same network.

18. The method of claim 1, wherein a cryptographic certificate is communicated during a secure sockets layer (SSL) handshake between a host server of the plurality of host servers and a user device of the plurality of user devices.

19. A method comprising:
detecting, by a network device of a first network, a plurality of encrypted sessions between a plurality of user devices of the first network and at least one host device of a second network different from the first network;
intercepting, by the network device, a cryptographic certificate during a handshake between each user device and each host device of each encrypted session;
determining, by the network device, that each encrypted session of a first subset of the plurality of encrypted sessions is associated with an entrusted cryptographic certificate and thereby represents a suspicious session;
in response to determining that the first subset of the plurality of encrypted sessions corresponds to a plurality of suspicious sessions, identifying a malicious session by decrypting encrypted content of the first subset of the plurality of encrypted sessions and inspecting the decrypted content of the plurality of suspicious sessions, or analyzing metadata related to the plurality of suspicious sessions;
performing, by the network device, an action to mitigate a harmful effect of the malicious session;
determining, by the network device, that each encrypted session of a second subset of the plurality of encrypted sessions is associated with a trusted cryptographic certificate and thereby represents a non-suspicious session;
in response to determining that the second subset of the plurality of encrypted sessions corresponds to a plurality of non-suspicious sessions, causing bypass of decryption of content of the second subset of the plurality of encrypted sessions or of analysis of metadata related to the plurality of non-suspicious sessions; and
overriding a certificate exception created by a user device of the plurality of user devices, in a transparent proxy mode without interfering with experiences of the plurality of user devices.

20. The method of claim 19, wherein identifying the malicious session comprises:
decrypting the suspicious session of the plurality of suspicious sessions and inspecting the decrypted session to identify malicious activity.

21. The method of claim 19, wherein the identifying the malicious session comprises:
analyzing the metadata associated with the suspicious session of the plurality of suspicious sessions without decrypting the suspicious session to identify malicious activity.

22. The method of claim 19, further comprising:
performing an action to mitigate harm to the first network by the malicious session.

23. The method of claim 19, wherein the network device has a trust store including a plurality of trusted cryptographic certificates, and detecting the suspicious session of the plurality of suspicious sessions comprises:
determining that a cryptographic certificate is an untrusted cryptographic certificate because it does not match any of the plurality of trusted cryptographic certificates of the trust store.

24. A network device comprising:
a processor; and
a memory storing instructions, execution of which by the processor causes the network device to:
intercept information transmitted by a plurality of host servers in response to a plurality of requests from a plurality of user devices seeking a plurality of encrypted connections with the plurality of host servers;
compare an identification of each host server to a blacklist of host servers such that any encrypted connection of a blacklisted host server is decrypted and inspected to identify malicious activity and any encrypted connection of a host server that is not blacklisted undergoes a cryptographic certificate validation process;
responsive to identifying an invalid cryptographic certificate, blacklist a host server having the invalid cryptographic certificate, decrypt the encrypted connection of the plurality of encrypted connections having the invalid cryptographic certificate, or analyze metadata of the encrypted connection having the invalid cryptographic certificate to determine a malicious connection; and
responsive to identifying a valid cryptographic certificate, allow the encrypted connection associated with the valid cryptographic certificate with a user device of the plurality of user devices and bypassing decryption of the encrypted connection associated with the valid cryptographic certificate; and
override a certificate exception created by a user device of the plurality of user devices, in a transparent proxy mode without interfering with experiences of the plurality of user devices.

25. The network device of claim 24 wherein the execution by the processor further causes the network device to:
perform an action to mitigate harm by the malicious activity on a network that includes the user device and the network device but not the host server.

* * * * *